W. A. COLLINS.
Fifth Wheel.
No. 104,932. Patented July 5, 1870.
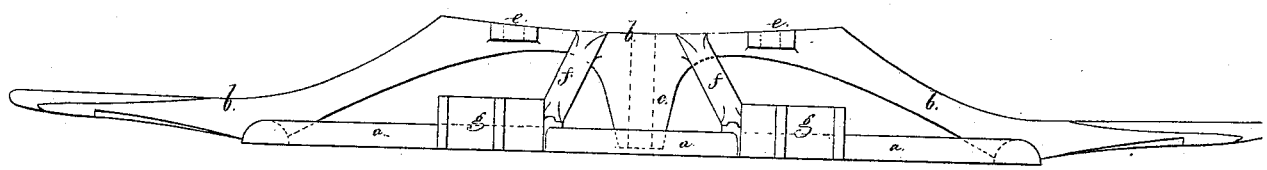
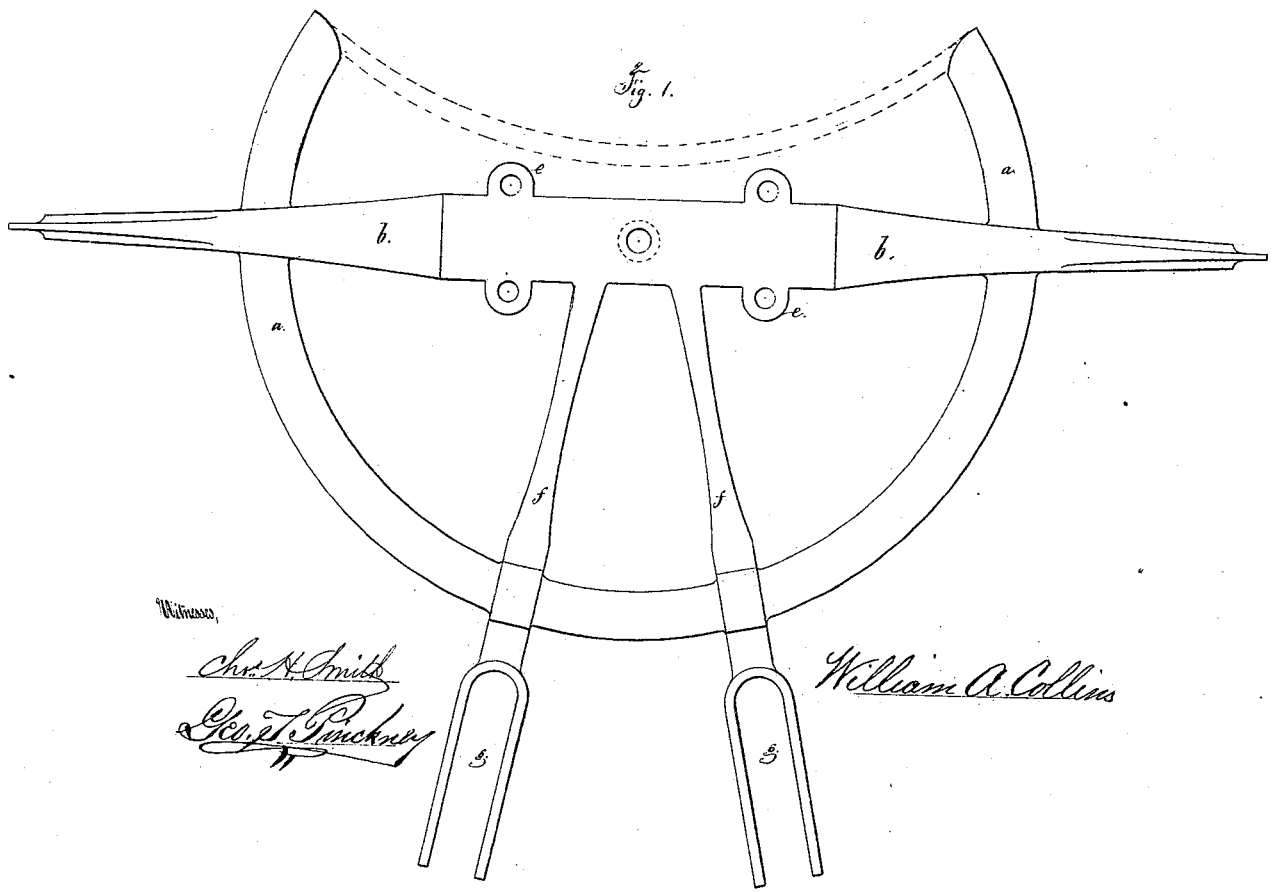

United States Patent Office.

WILLIAM A. COLLINS, OF BLOOMFIELD, NEW JERSEY.

Letters Patent No. 104,932, dated July 5, 1870.

IMPROVEMENT IN FIFTH-WHEEL FOR CARRIAGES.

The Schedule referred to in these Letters Patent and making part of the same.

To all whom it may concern:

Be it known that I, WILLIAM A. COLLINS, of Bloomfield, in the county of Essex and State of New Jersey, have invented and made a new and useful Improvement in Fifth-Wheels for Carriages; and the following is declared to be a full, clear, and exact description thereof.

Heretofore it has been usual to make the fifth-wheels of carriages of wrought iron, the parts being forged out, and welded together with considerable labor. Besides this, the perch or perches extend to the wooden bolster, and have to be connected at the ends to the same by mortises and tenons, and usually the perch is connected to the fifth-wheel, and the spring rests upon the wooden bolster.

I make my fifth-wheel of cast metal, having a cross-bar that receives the king-bolt, and also forms the bolster for the spring; and from this cross-bar a bar or bars extend to the rear crossing, the fifth-wheel united therewith, and terminating as a jaw to receive the end of the wooden perch.

By this construction the wooden bolster is dispensed with, the king-bolt rendered less liable to wear loose, the mortising of the perch into the bolster is avoided, and the parts are made much stronger, more compact, with less workmanship, and superior in appearance to those heretofore made.

I prefer that this fifth-wheel be made of malleable cast-iron, but it may be made out of any suitable cast metal.

In the drawing—

Figure 1 is a plan of said fifth wheel and its parts, and

Figure 2 is a rear elevation of the same.

The circle or segment $a$ is of the desired diameter, and the bar $b$, extending across the same, receives at the center the king-bolt, and I form the bar $b$ as a long socket, $c$, as seen in fig. 2, so that the king-bolt may have a better bearing.

The upper surface of the bar $b$ receives the spring, and the said spring may be connected by bolts passing through holes, or by a clip over the spring, held by nuts beneath eyes cast upon the sides of the bar $b$, as seen at $e$.

The arms $ff$ extend from the bar $b$ across the segment $a$, and terminate as jaws $g$, for the reception of the ends of the perch.

One or more of these arms and jaws may be used, according to the character of the carriage.

These parts, being all made of metal, are very strong, and the work upon the carriage is materially lessened by this construction.

An ornamental metallic connection may be provided between the ends of the fifth-wheel $a$, as seen in fig. 1, by dotted lines, the same arching upward and backward.

I claim as my invention—

The fifth-wheel for carriages, made with the metal bar $b$, forming the bolster, and the arm $f$, for connecting to the perch, in the manner and for the purposes set forth.

Dated this 9th day of May, A. D. 1870.

WILLIAM A. COLLINS.

Witnesses:
CHAS. H. SMITH,
GEO. T. PINCKNEY.